UNITED STATES PATENT OFFICE.

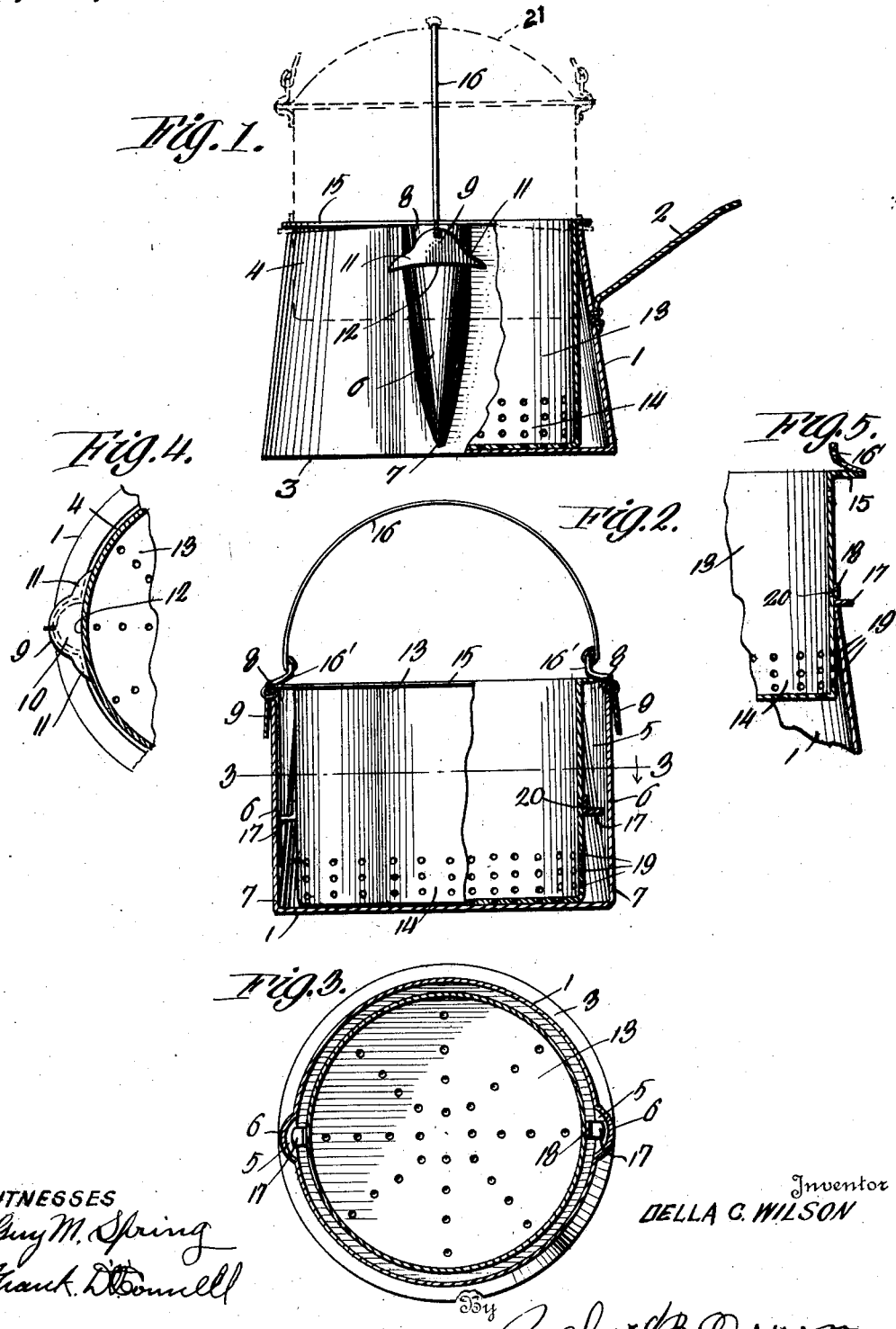

DELLA C. WILSON, OF EAGLE ROCK, CALIFORNIA.

KETTLE.

1,391,231.  Specification of Letters Patent.  Patented Sept. 20, 1921.

Application filed October 4, 1920. Serial No. 414,475.

*To all whom it may concern:*

Be it known that I, DELLA C. WILSON, a citizen of the United States, residing at Eagle Rock, in the county of Los Angeles and State of California, have invented certain new and useful Improvements in Kettles, of which the following is a specification.

This invention relates to cooking utensils and more particularly to a kettle or other analogous receptacle and has for its primary object to provide a utensil comprising separable receptacles adjustably associated, one within the other.

Another object is to provide a utensil of the character referred to wherein the inner receptacle may be adjustably supported in raised position within the outer receptacle, to permit among other things the drainage of the fluid contents of the inner receptacle.

A further object of the invention is to provide a sectional utensil wherein the receptacle sections are capable of being disassociated only when adjusted to a predetermined relative position; the outer receptacle having means provided to coöperate with the sides of the inner receptacle when the latter is supported in raised position within the former, for utilizing the steam of the outer receptacle in maintaining the contents of the utensil at a desirable temperature.

With other objects in view, the invention consists in the details of arrangement and combination of parts as are hereinafter more fully pointed out and illustrated in the accompanying drawings, in which—

Figure 1 is a front elevation, a portion of the inner and outer receptacles being shown in section.

Fig. 2 is a vertical longitudinal section.

Fig. 3 is a horizontal section taken on the line 3—3 of Fig. 2.

Fig. 4 is a fragmentary detail view illustrating the closure means for the channel way and Fig. 5 is a detail sectional view showing the manner in which the lug supports the inner receptacle in elevated position.

Referring now more particularly to the drawing the numeral 1 indicates an outer receptacle having a handle 2 and an enlarged base 3 from which the side wall tapers inwardly to form the upper end 4. The side wall of the receptacle 1 is provided with channel ways 5 which may be formed either by depressing the wall outwardly to form an inverted cone shaped projection 6, extending vertically of the receptacle with its apex 7 adjacent the bottom of the receptacle and its base 8 opening adjacent the upper end 5, or it may be formed by merely cutting V shaped slots with sides slightly curved outwardly in the receptacle wall 1 and covering them on the outside by suitable casings of guard members 6 as illustrated. Loosely hinged to the upper end of each inverted cone shaped projection 6 is a cap or closure plate 9 which, as illustrated to advantage in Fig. 1 of the drawings comprises a central cap portion 10 adapted to overlap the opened end 8 of the casing 6 so as to effectively close the channel way 5 and having wings 11 projecting laterally therefrom on opposite sides of the casing 6 for snug engagement with the side of the inner receptacle of the invention, when the latter is partly disposed within the receptacle 1; the cap portion 10 and wings 11 having their inner edges 12 curved in conformity with the curvature of the inner receptacle.

The inner receptacle 13 is adapted to fit into the outer receptacle 1, being snugly embraced by the upper end 4 of the latter and has its bottom and sides perforated as at 14 to permit the fluid contents to be drained into the outer receptacle when the inner member 13 is withdrawn therefrom. The upper end of the receptacle 13 is provided with a flange 15 which overlaps the upper rim of the outer receptacle and supports the receptacle 13 with its bottom resting only lightly on bottom of the outer receptacle, thus insuring an airtight joint between the contacting portions of the two receptacles. Said flange being wide enough to cover the channel ways, thereby preventing any steam escaping therethrough, by means of having the joints substantially steam tight, it is apparent that the beneficial heating qualities of the steam is fully utilized in bringing the temperature within the utensil to the required degree of heat for cooking purposes, thus accelerating and facilitating the boiling or cooking of the food therein; said flange 15 has ears 16' rising from edge of flange to which is attached bail 16 to facilitate the removal of inner receptacle. When the inner receptacle is supported only partly within the outer receptacle, the channel ways 5 may then be closed by cap 9 in the manner previously described and the trapped steam will circulate around the raised bottom of the inner receptacle and may penetrate to the interior through the drain holes 14. Supporting lugs 17 are secured to the side walls of receptacle 13 between the flanged end 15 and the drainage end 14, by means of the supporting plate 18 of each lug which lies flat against the side of the receptacle to which it is riveted or bolted, as indicated at 20. These lugs project outwardly from opposite sides of receptacle 13 and are to be brought into engagement with the upper rim 4 of the outer receptacle to support the inner receptacle thereon, with its perforated portion in spaced elevated position above the bottom of the outer receptacle, as indicated by the dotted line structure of Fig. 1.

In the primary use of the utensil, the receptacles would be arranged, one within the other as illustrated in Fig. 2 and the articles to be cooked would be deposited in the inner receptacle; the outer receptacle providing a container for the necessary amount of water for cooking purposes.

When the cooking process is completed and it is desired to drain the cooked articles, the inner receptacle is merely lifted by the bail 16 until the lugs are clear of the channel ways, after which the receptacle is turned axially until the lugs are disalined from the channel ways and overlap the rim 4 of the outer receptacle. Upon then lowering the receptacle until the lugs rest upon the rim 4, the inner receptacle may be supported with its perforated portions in spaced elevated positions above the bottom of receptacle 1 as indicated by the dotted lines structure of Fig. 1 and may be permitted to remain in this position until the draining is fully effected. The inner receptacle is further adapted, when in such elevated position, to be utilized as a means for keeping warm articles previously cooked. This is usually done when the outer receptacle 1 is used as a separate cooking utensil, unassociated with the inner receptacle. The articles to be kept warm are placed within the inner receptacle and the latter supported within the outer receptacle by means of its lugs as previously described, the steam arising from the cooking contents of the outer receptacle enveloping the elevated end of the partially inserted receptacle 13 and penetrating the perforated portion, its escape through the open end of the receptacle being prevented by suitable cover means.

To permit the inner receptacle to be entirely inserted within the outer receptacle, it is necessary that the lugs 17 be first brought into registry with the open ends 8 of the casing 6 so that they may be accommodated within the channel ways 5 during the downward movement of the inner receptacle. It is to be noted that the channel ways permit only vertical movement of the lugs and consequently any attempt to turn the inner receptacle within the outer receptacle would cause the lugs to abut against the sides of the channel ways and prevent such turning movement. The inner receptacle is, therefore, at all times in position to be promptly withdrawn from the outer receptacle and this may be done without any inconvenience or delay.

From the foregoing description it will be seen that I have provided a utensil which is sectional in character and in which the sections may be associated to form a unitary structure or disassociated from each other at the will of the user. It is to be further understood that although the above description and accompanying drawings have reference to what may be considered the preferred or approved form of my invention, any suitable change in construction and arrangement of parts may be resorted to as prove expedient and which are permissible within the scope of the appended claim.

Having thus fully described my invention, what I claim as new and desire to secure by Letters Patent is:—

In a device of the class described, the combination with an outer upwardly tapering receptacle provided with opposing outwardly dished inverted cone shaped channel ways, a handle fixed to said receptacle, a perforated cylindrical inner receptacle adapted to snugly fit into said outer receptacle, opposing lugs fixed to the outer wall of said inner receptacle whereby said inner receptacle may be held in a draining position on the upper edge of said outer receptacle, handle ears fixed to said inner receptacle above said lugs, a handle held to said ears, and caps loosely hinged to said outer receptacle for closing said channel ways, all as and for the purposes set forth.

In testimony whereof I affix my signature in presence of two witnesses.

DELLA C. WILSON.

Witnesses:
ESTHER AKINS,
MARY J. VANCE.